United States Patent
Robertson, Jr. et al.

(10) Patent No.: US 6,498,323 B1
(45) Date of Patent: Dec. 24, 2002

(54) HEATING ELEMENT FOR A SLOW COOKER

(75) Inventors: William Terry Robertson, Jr., Auburn, AL (US); Kavin Wayne Jones, Clinton, MO (US)

(73) Assignee: The Holmes Group, Inc., Milford, MA (US)

(*) Notice: Subject to any disclaimer, the term of this patent is extended or adjusted under 35 U.S.C. 154(b) by 0 days.

(21) Appl. No.: 09/950,842

(22) Filed: Sep. 12, 2001

(51) Int. Cl.[7] .................... A47J 36/00; A47J 27/00; H05B 3/06; H05B 3/58
(52) U.S. Cl. ............... 219/433; 219/436; 219/522; 219/546; 219/548
(58) Field of Search ................ 219/433, 429, 219/432, 436, 542, 546, 548, 522

(56) References Cited

U.S. PATENT DOCUMENTS

| | | | |
|---|---|---|---|
| 919,843 A | | 4/1909 | Fish |
| 1,046,888 A | * | 12/1912 | Stanley ............... 219/436 |
| 2,074,985 A | * | 3/1937 | Hofferbert ............ 219/417 |
| 2,187,888 A | * | 1/1940 | Nachumsohn .......... 219/417 |
| 2,265,295 A | * | 12/1941 | Layton ............... 219/436 |
| 2,292,854 A | | 8/1942 | Wilcox |
| 2,371,975 A | * | 3/1945 | Parsons ............... 219/433 |
| 2,414,868 A | | 1/1947 | Gunther |
| 3,881,090 A | | 4/1975 | Scott |
| 3,940,589 A | | 2/1976 | Tupper |
| 4,039,777 A | | 8/1977 | Baker |
| 5,271,085 A | | 12/1993 | Carballo |
| 5,359,179 A | * | 10/1994 | Desloge et al. ........ 219/535 |
| D362,089 S | | 9/1995 | Moore et al. |
| 5,673,611 A | | 10/1997 | Tieman |
| 5,865,098 A | | 2/1999 | Anelli |
| 6,102,238 A | | 8/2000 | Brady et al. |
| D431,149 S | | 9/2000 | Cooke et al. |
| D434,266 S | | 11/2000 | Dobson et al. |
| D434,940 S | | 12/2000 | Hlava et al. |
| 6,274,847 B1 | * | 8/2001 | Hlava et al. ........... 219/433 |

\* cited by examiner

Primary Examiner—Joseph Pelham
(74) Attorney, Agent, or Firm—Hoffmann & Baron, LLP; Francis E. Marino

(57) ABSTRACT

A cooking apparatus including a housing having an interior which contains a heating device. The cooking apparatus includes a liner which is preferably made of metallic material with a bowl which may be removably placed therein to cook food. The heating device is a heating band which has downwardly extending foot members to prevent the heating element from contacting the floor of the housing to prevent hot spots and inadvertent burning of a users hand.

19 Claims, 3 Drawing Sheets

HEATING ELEMENT FOR A SLOW COOKER

BACKGROUND OF THE INVENTION

1. Field of the Invention

The invention relates to a apparatus for use in a electric cooking utensil known as a slow cooker or Crock-Pot® and more particularly to the heating element which is used for heating the bowl or basin used to contain the food being cooked.

2. Description of the Prior Art

A slow cooker is a type of cooking device that is well known in the art. An example of such a device is marketed by the assignee of this application under the trademark Crock-Pot® Slow cookers usually include a stoneware or ceramic vessel for holding the food. The stoneware vessel is removably insertable into a heating liner which is placed within a housing. The liner is generally a metallic basin or dish which follows the outer contours of the stoneware or ceramic vessel so that when the heated liner is activated, the heat will evenly distribute over the surface of the stoneware. Slow cookers typically have a selector switch having a high, low and off setting for varying heat settings which thereby affect the cooking time.

The heating units of slow cookers are typically simple devices. A slow cooker has an inner heat conductive, and usually metallic, liner which is used to evenly HEATING ELEMENT FOR A SLOW COOKER distribute heat over the stoneware vessel. The liner is usually heated by a thin heating element band which is wrapped around the exterior of the metallic basin. The heating element can be a simple heating band which is held on by a compression fit over the outside of the metallic basin. The liner typically has a ridge or similar structure that assists in securing the heating band around the liner.

Slow cookers rely on a slow even rate of cooking to function. Cooking time in slow cookers may be several hours. The low temperature of the cooking permits the user of the device to start cooking a meal in the morning and have it ready and properly cooked in time for dinner. Due to the slow cooking nature of the device, the contents of the stoneware need not be constantly monitored in order to prevent burning. In addition, the relatively low power and even distribution of heat of the slow cooker prevents hot spots from forming in the stoneware, which could lead to thermal stresses and ultimately cracking of the stoneware. The stoneware that is used acts as an insulator which is beneficial for slow cooking and an even distribution of the heat. Slow cookers allow simmering type cooking over several hours.

One advantage of using a slow cooker is that the devices are very easy to transport and may be moved to any place that the user desires due to their small size and easy portability. However, due to constant moving and usage of the slow cooker, prior designs have experienced problems with the heating element slipping off the metallic liner since it is usually held on by a compression fit. The heating element then falls onto the floor of the housing.

If the heating element is activated after falling on to the floor of the housing, a hot spot may be created. The hot spot on the outer housing creates a safety concern since the user may be unaware of the hot spot and be inadvertently burned. Furthermore, should the outer housing be made of a heat conductive material, the area where the slow cooker is placed may become hot or damaged.

It would be desirable to have a heating element which has a safety feature to eliminate the hot spot on the floor of the housing should the heating band become detached from the metallic liner.

It would further be desirable to have a safety feature which is easy to construct and could be used with pre-existing slow cooker designs and slow cooker heating elements.

SUMMARY OF THE INVENTION

The present invention is an electric cooking apparatus having an outer housing with an open upper end. The housing contains an inner heat conductive lining that is sized to fit within the outer housing to create an air space between the outer housing and the liner. The liner has a bottom with an upwardly extending sidewall. The liner is preferably made of a heat conductive material such as metal. A heating element is positioned in physical contact on the outer surface of the liner sidewall and is placed a distance above the liner bottom. The heating element includes several foot members extending downwardly from the heating element. The electric cooking apparatus further includes a cooking insert which is removably positioned inside of the liner.

In the preferred embodiment the heating element can be a metallic band which is positioned around the liner sidewall using a compression fit. The heating element can be controlled by a control means which allows for selectively controlling the heat output of the heating element. Preferably the control means has several settings such as off, low heat, and high heat. The heating element is preferably made of a heat conductive material such as aluminum or steel. The foot members are preferably positioned in equal distance from each other about the heating element. The foot members in the preferred embodiment are a predetermined length to prevent the heating element from touching the housing floor should the heating element become detached from the liner.

In the preferred embodiment, the cooking insert is made of a heat conductive material such as a ceramic, porcelain or metallic material. The cooking insert is positioned inside of the liner so that the sidewall of the cooking insert contacts the sidewall of the liner. The cooking insert is preferably has a bowl shape to hold food. A cover can be used to cover the cooking insert and the food contents while in use. The cover is preferably made of a translucent or clear glass.

A preferred form of the electric cooking apparatus, as well as other embodiments, objects, features and advantages of the present invention will be apparent from the following detailed description of illustrative embodiments thereof, which will be read in conjunction with the accompanying drawings.

DETAILED DESCRIPTION OF THE INVENTION

The present invention provides a slow cooker apparatus having an improved heating element which prevents movement of the heating element from around the metallic liner to provide optimum safety in operation.

Figure 1:
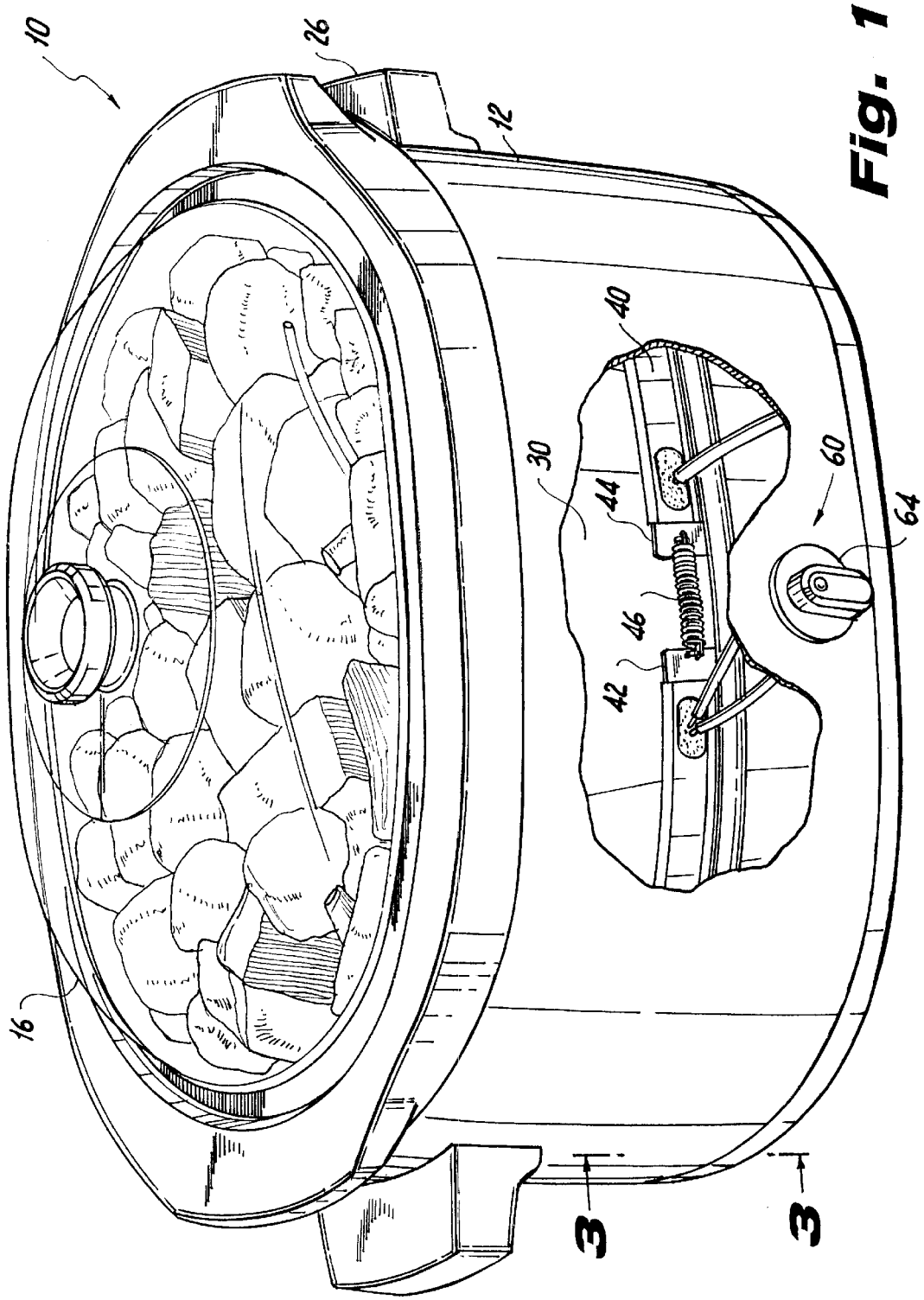
FIG. 1 is a top perspective view of the cooking apparatus of the present invention with a partial cut away showing the heating element.
Figure 2:
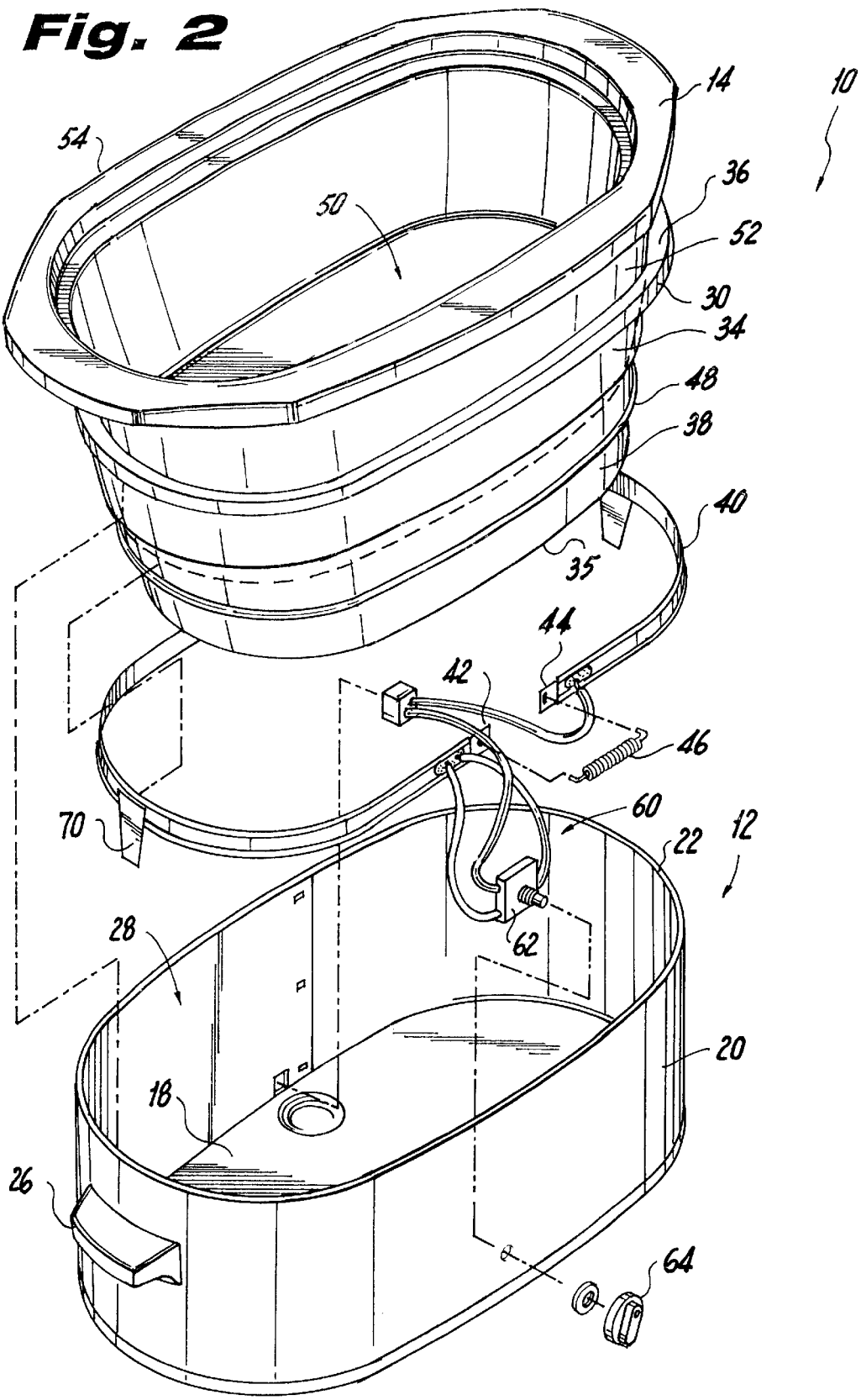
FIG. 2 is an exploded perspective of the cooking apparatus of the present invention.

Referring initially to FIGS. 1 and 2, the cooking apparatus 10 of the present invention generally includes a housing assembly 12 and cooking insert 14 that is used to hold the food. The cooking insert 14 is essentially a pot used for slow cooking and is preferably formed of a stoneware material or a ceramic material of a type used to form standard slow cooker inserts. The cooking insert 14 is removably insertable within the housing assembly 12 so that the user may easily clean it when desired. In addition, a cover or lid 16 is further provided to cover the contents in the cooking insert 14. The lid 16 may be made of clear glass so that the user may view the food that is being cooked.

Referring to FIG. 2, the housing assembly preferably includes a housing floor 18 which is parametrically bounded by an upwardly extending sidewall 20 ending in a rim 22. The floor 18 and sidewall 20 define a housing interior 24. The sidewall 20 may include a pair of outwardly extending handles 26 in order to permit an individual to carry the cooking apparatus 10. The housing interior 24 includes an inner surface 28. A liner 30 which is preferably formed of a heat conducting material such as aluminum or steel is provided within the housing 12. The liner 30 conforms to the shape of the inner surface of the sidewall 20 and floor 18 and is configured to receive the cooking insert 14. The liner 30 is preferably sized smaller than the housing 12, whereby an air space 32 is created between the liner 30 and the housing 12 so that a heating element 40 may be placed around the liner 30 between the housing 12 and the liner 30. The liner 30 has a liner sidewall 34 extending from a bottom wall 35 to a lip 36 which extends over to the sidewall 20 of the housing 12 to close off the air space 32.

In order to heat the food contents within the cooking insert 14, a heating element 40 is positioned about the outer surface 38 of the liner 30. A heating element 40 preferably includes a plurality of resistance type elements (not shown) formed in a band which is wrapped around the liner sidewall 34. When the heating element 40 is supplied with power, heat is created and then transferred to the liner sidewall 34, which through conduction, carries the heat throughout the liner 30. The liner 30 distributes the heat to the cooking insert 14 that is positioned within the liner 30. In order to protect the housing sidewall 20 and floor 18 from the heat, the air space 32 which is between the liner 30 and the housing 12 is of a sufficient distance so that only the liner 30 becomes hot. In an alternative embodiment (not shown) there may be sidewall insulation on the housing to further reduce the chance that the heating element will transfer any heat to the housing.

Figure 3:
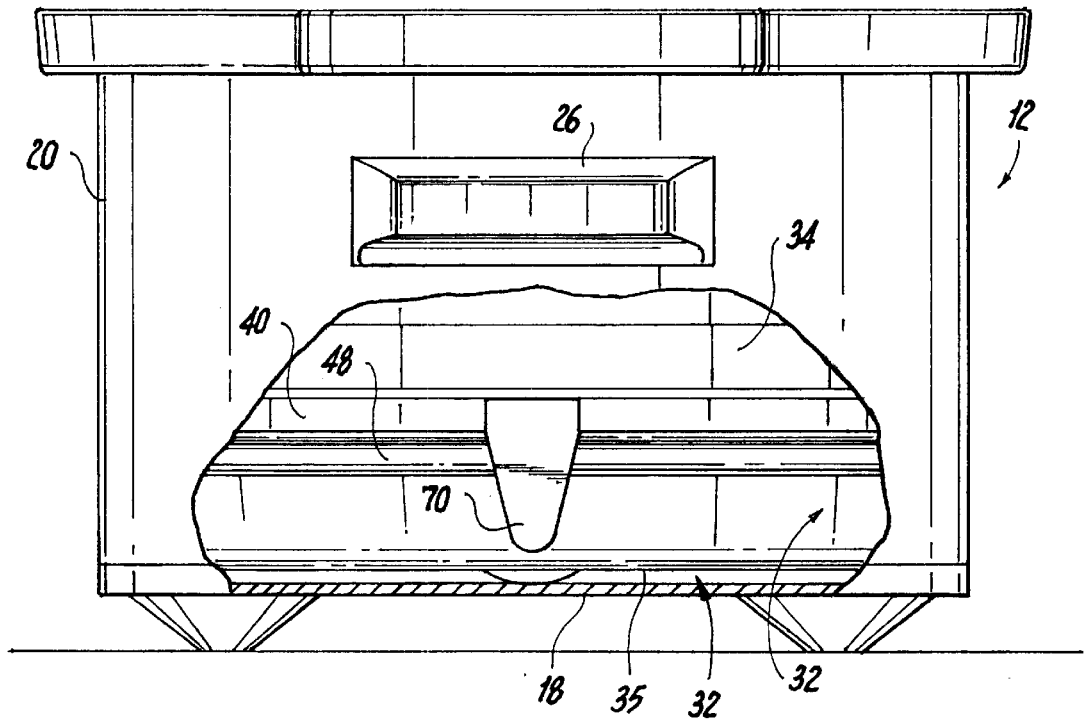
FIG. 3 is a left side elevational view of the cooking apparatus of the present invention with a partial cut away section along line 3—3 of FIG. 1 showing the heating element in place.

Referring to FIGS. 2 and 3 the cooking insert 14 is configured to closely follow the contour of the liner 30. In the preferred embodiment the cooking insert 14 is made of a ceramic or stoneware material and contacts the liner 30 when correctly positioned in the cooking apparatus 10. The cooking insert 14 has a bottom wall 50 surrounded by an upwardly sidewall 52 which ends in the outwardly extending annular flange 54. When the cooking insert 14 is placed within the liner 30 in the housing 12, the flange 54 is supported by the housing rim 22 and sidewall 20, while the bottom wall 50 extends into the housing interior 24.

The heating element 40 may include a control circuit 60 which is used to vary the heat produced by the heating element 40. The control circuit 60 preferably includes a controller in the form of a user actuatable selector switch 62. The selector switch 62 may be chosen from any number of switches on the market that are well known in the art. Preferably, the selector switch 62 may include three discrete positions, off, low and high. An indicator light such as an LED may be provided to indicate that the selector switch is in the low or high position (not shown). The user may select either the low or high setting depending on the food that is being cooked in the slow cooker. The selector switch 62 is connected with the control circuit 60 such that it receives current directly from the power source and then supplies the needed current to the heating element 40. The selector switch 62 is preferably located on the housing sidewall 20. A dial 64 positioned on the outside of the sidewall 20 may be provided to permit a user to actuate the selector switch 62. The selector switch 62 may have an automatic function contained therein so that the amount of current supplied to the heating element 40 will not go above a predetermined level.

The heating element 40 will now be described in further detail. Referring to FIG. 2, the present invention includes a heating element 40 which is positioned in close proximity with the liner 30. The heating element 40 is preferably a band type heating element which is well known in the art, and is not described in detail. The heating element 40 typically involves using resistance coils on the inside of a metallic band which are wrapped in mica paper as insulation. Such heating bands are known by those skilled in the art. The heating element 40 may be made of either aluminum or steel.

The heating element 40 preferably contacts the liner 30 and wraps completely around the outer surface 38. The heating element 40 may be a one piece band which wraps completely around the liner 30. In the preferred embodiment, the heating element 30 has a first end 42 and a second end 44 which are held together to form the complete band. The first end 42 and second end 44 are preferably held together by the use of a resilient member 46 to form a compression fit around the liner 30. The resilient member 46 may be a spring which holds the first end 42 and second end 44 together. The heating element 40 may be further secured to the liner 30 by a raised rib 48 that is integrally molded into the outer surface 38 of the liner 30. In the preferred embodiment, the rib 48 extends laterally completely around the outer surface 38 so that the heating element 40 may be placed above the rib 48. The compression fit of the heating element 40 may be positioned above the rib 48 to further prevent the heating element 40 from falling off of the liner 30. Prior designs have used this common method of attaching the heating element 40.

Due to the portability of the slow cooker, the user may constantly move the apparatus to different locations. Such movement could jostle the heating element 40 enough to partially remove it from the liner 30 or cause it to fall completely off the liner 30. In addition, the resilient member 46 may either break or become loose. Should the compression fit of the heating element 40 around the liner 30 fail, the heating element 40 may fall off the liner 30 and onto the housing floor 18.

A safety hazard is created by the heating element 40 falling off the liner 30. If the heating element 40 is activated when it touches the housing floor 18, it may cause the housing floor 18 to become hot if the housing floor 18 is made of a heat conductive material. In addition, if the housing 12 is made of a heat conductive material it is possible that the area where the slow cooker is placed, such as a countertop, may be damaged by the heat transfer from the housing 12. Furthermore, some slow cookers may have a housing 12 made of a high strength plastic which is heat resistant but may melt after prolonged exposure to heat such as when the heating element 40 may fall onto the housing floor 18. The present invention addresses the safety issue regarding the heating element 40 falling on the housing floor 18 and provides an added measure of safety to using the slow cooker.

Referring to FIGS. 2 and 3, the present invention has a plurality of foot members or extensions 70 extending downwardly from the heating element 40. Preferably these extensions 70 are of a length so that the heating element 40 does not touch the housing floor 18 should it become detached from contacting the liner 30. The extensions 70 are preferably placed an equal distance from each other so that the heating element 40 is held at a level height when placed on a flat surface. The extensions 70 may be made in any shape, so long as they can support the heating element above the floor of the housing.

The extensions 70 are preferably of a length so that they do not interfere with the proper mounting of the heating element 40 on the liner 30 or the functioning of the heating element 40 when activated. The extensions 70 may be made of any material which provides strength and is resistant to the heating effects of the heating element 40 being turned on and off. The extensions 70 are preferably made of the same material as the heating element 40 such as aluminum or steel and may be welded using tack welds to the heating element 40. Alternatively, the extensions 70 may be made from a heat resistant material such as plastic, which will not conduct heat to the housing floor in case of slipping off the liner. The present invention provides an added safety measure to the slow cooker should the heating element 40 be inadvertently detached.

Referring to FIG. 3, the present invention has a heating element 40 attached with a compression fit to the liner 30. The extensions 70 in the preferred embodiment do not touch the housing floor 18 when the heating element 40 is properly attached to the liner 30. The heating element 40 is attached to the liner 30 with a compression fit above the rib 48 in the liner outer surface 38. The extensions 70 do not in any way change or interfere with the operation of the cooking apparatus 10 when the heating element 40 is properly positioned.

Figure 4:
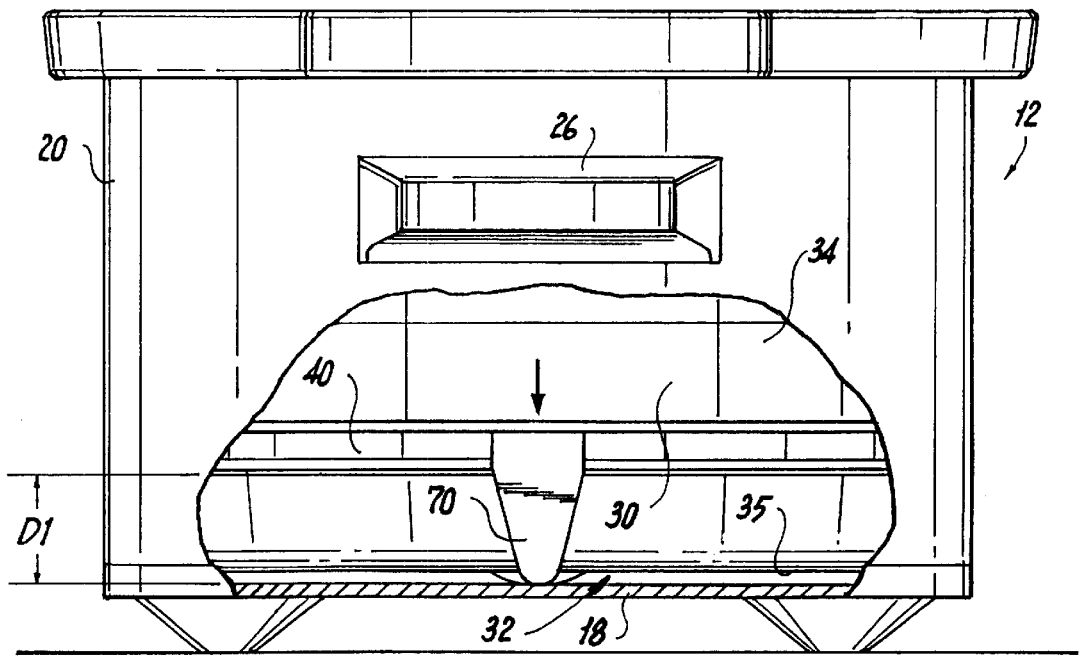
FIG. 4 is a left side elevational view of the cooking apparatus of the present invention with a partial cut away section along line 3—3 of FIG. 1 showing the heating element detached from the liner.

Referring now to FIG. 4, the heating element 40 of the present invention is shown to be detached from the liner 30. The compression fit of the heating element 40 has failed, and the heating element 40 is no longer positioned correctly on the liner 30. The extensions 70 on the heating element 40 are shown to contact the housing floor 18 and the heating element 40 is spaced a distance DI from the housing floor 18. The heating element 40 will not create a hot spot in the housing floor since the extensions 70 effectively stop the heating element 40 from touching the housing floor 18.

Thus while there has been described what are presently believed to be preferred embodiments of the present invention, other and further modifications and changes can be made thereto without departing from the true spirit of the invention. It is intended to include all further and other modifications and changes that would come within the true scope of the invention as set forth in the claims.

What is claimed is:

1. An electric cooking apparatus comprising:
   an outer housing, said housing having a housing floor and an upwardly extending sidewall;
   an inner heat conductive liner, said liner being sized to fit in said outer housing and create an air space between said outer housing and said liner, said liner having a bottom and upwardly extending sidewalls, said sidewalls having an outer surface;
   a heating element positioned in physical contact with said liner sidewall outer surface above said liner bottom, said heating element including a plurality of foot members extending downwardly from said heating element; and
   a cooking insert positioned inside of said liner.

2. An electric cooking apparatus as defined in claim 1, wherein said heating element is a metallic band position around the outer surface of said liner sidewalls.

3. An electric cooking apparatus as defined in claim 1, wherein said heating element is a continuous band around said liner.

4. An electric cooking apparatus as defined in claim 1, wherein said heating element further includes a control circuit for selectively controlling the heat output of said heating element.

5. An electric cooking apparatus as defined in claim 4, wherein said control circuit further includes a selector switch.

6. An electric cooking apparatus as defined in claim 1, wherein said heating element is made of a heat conductive material.

7. An electric cooking apparatus as defined in claim 1, wherein said plurality of foot members are equally spaced from each other about said heating element.

8. An electric cooking apparatus as defined in claim 1, wherein said plurality of foot members are a predetermined length to prevent the heating element from touching said housing floor.

9. An electric cooking apparatus as defined in claim 1, wherein said cooking insert is made of a heat conductive ceramic, porcelain or metallic material.

10. An electric cooking apparatus as defined in claim 1, wherein said liner further includes an annular lip around said liner sidewall which extends to contact said outer housing thereby enclosing said air space between said outer housing and said liner.

11. An electric cooking apparatus comprising:
    an outer housing, said housing having a housing floor and an upwardly extending sidewall;
    a liner constructed of a heat conductive material, said liner being a predetermined size to fit in said outer housing and thereby create an air space between said outer housing and said liner, said liner having a bottom and upwardly extending sidewalls, said sidewalls having a outer surface;
    a heating element positioned in physical contact with said liner sidewall outer surface, wherein said heating element is a heat conductive band, said band having a first and a second end wherein said band wraps around said liner and the two ends of said band are connected by a resilient member to form a compression fit around said basin, said heating element including a plurality of foot members extending downwardly from said heating element; and
    a cooking insert positioned inside said liner, said cooking insert being made of a heat conductive material.

12. An electric cooking apparatus as defined in claim 11, wherein said resilient member is a spring.

13. An electric cooking apparatus as defined in claim 11, wherein said heating element is made of a metallic material.

14. An electric cooking apparatus as defined in claim 11, wherein said plurality of foot members are equally spaced from each other about said heating element.

15. An electric cooking apparatus as defined in claim 11, wherein said plurality of foot member s are of a predetermined lengths to prevent the heating element from touching said housing floor.

16. An electric cooking apparatus as defined in claim 11, wherein said cooking bowl is made of a heat conductive ceramic, porcelain or metallic material.

17. An electric cooking apparatus as defined in claim 11, wherein said heating element further includes a control circuit for selectively controlling the heat output of said heating element, said control circuit having a selector switch.

18. An electric cooking apparatus as defined in claim 11, wherein said liner further includes an annular lip positioned on said liner sidewall extending substantially horizontally therefrom to said outer housing to close of said air space.

19. An electric cooking apparatus as defined in claim 11, further including a cover which substantially covers the opening formed by said cooking insert.

\* \* \* \* \*